United States Patent
Hung

(10) Patent No.: US 9,989,438 B2
(45) Date of Patent: Jun. 5, 2018

(54) CONTROL VALVE TESTING METHOD

(71) Applicant: Fei-Che Hung, Taoyuan (TW)

(72) Inventor: Fei-Che Hung, Taoyuan (TW)

( * ) Notice: Subject to any disclaimer, the term of this patent is extended or adjusted under 35 U.S.C. 154(b) by 442 days.

(21) Appl. No.: 14/809,574

(22) Filed: Jul. 27, 2015

(65) Prior Publication Data

US 2017/0030803 A1 Feb. 2, 2017

(51) Int. Cl.
*G01M 13/00* (2006.01)
(52) U.S. Cl.
CPC .................... *G01M 13/00* (2013.01)
(58) Field of Classification Search
CPC ...................................... G01M 13/00
USPC ............................................. 73/1.72
See application file for complete search history.

(56) References Cited

U.S. PATENT DOCUMENTS

| | | | | |
|---|---|---|---|---|
| 4,949,288 A * | 8/1990 | Bookout | ................. | F16K 17/04 702/140 |
| 5,502,999 A * | 4/1996 | Seberger | ............... | F15B 19/002 73/1.59 |
| 6,192,321 B1 * | 2/2001 | Grumstrup | ............. | G05B 21/02 137/1 |
| 6,397,655 B1 * | 6/2002 | Stephenson | ......... | F15B 13/0442 73/1.72 |
| 7,562,554 B2 * | 7/2009 | Yoo | ....................... | E02F 9/2221 73/1.72 |
| 8,036,837 B2 * | 10/2011 | Wilke | ................. | F16K 37/0091 702/35 |
| 2001/0037670 A1 * | 11/2001 | Boger | ..................... | F15B 5/006 73/1.72 |
| 2013/0183443 A1 * | 7/2013 | Hirose | ................. | H03K 21/023 427/248.1 |

* cited by examiner

*Primary Examiner* — Daniel S Larkin
(74) *Attorney, Agent, or Firm* — Chun-Ming Shih; HDLS IPR Services

(57) ABSTRACT

A control valve testing method comprises steps: providing a testing device, inputting data in the testing device, electrically connecting the testing device to the location transmitter installed on the control valve, the transmitter connected with a pointer of a valve spindle, the testing device providing an electric current with a testing opening to an electric current air transformer, the electric current air transformer controlling air compressor applying a specific pressure according to the current on the control valve for triggering a valve spindle action to drive the location transmitter to obtain valve spindle action strokes data, transferring the data and performing a comparison between the data with the previously inputted actual opening data for analyzing the error percentage of the actual opening and the testing opening. If the error percentage is within a tolerance range, the result is qualified, and if not, the result is not qualified.

10 Claims, 4 Drawing Sheets

Pressure Control Valve Testing/Calibration Record

Client Name: ⬚  Determination Result: ⬚
Project Name: ⬚
Instrument Number: test20140815    Action: FC ▼  ☐ LOCK
Instrument Brand: ▼    Operating Start Point: 2.00 %
Instrument Serial Number: 12345678-9    Operating Stop Point: 98.00 %
Tolerance Error Percentage: ± 0.5 %    Total Action Time Length: 0.00
Transfer Function: Linear ▼

| Actual Opening(%) | Output (mA) | Testing Opening(%) | Manual Opening(%) | Error Percentage(%) |
|---|---|---|---|---|
| 0 | 4.00 | 0.00 | -------- | 0.00 |
| 25 | 8.00 | 0.00 | -------- | -25.00 |
| 50 | 12.00 | 0.00 | -------- | -50.00 |
| 75 | 16.00 | 0.00 | -------- | -75.00 |
| 100 | 20.00 | 0.00 | -------- | -100.00 |
| 75 | 16.00 | 0.00 | -------- | -75.00 |
| 50 | 12.00 | 0.00 | -------- | -50.00 |
| 25 | 8.00 | 0.00 | -------- | -25.00 |
| 0 | 4.00 | 0.00 | -------- | 0.00 |

Calibration Curve

Note:
Tester:  / /   Verifier:  / /

FIG.5

CONTROL VALVE TESTING METHOD

BACKGROUND OF THE INVENTION

Field of the Invention

The present invention relates to a control valve testing method and in particular relates to a percentage-based control valve testing method.

Description of Prior Art

In a foundry or chemical processing factory, control valves with different pressures and with different structures are designed and used according to the fluid categories, equipment and user demands. After a control valve is installed, a primary step is to perform a control test on the control valve for assuring the opening actions of the control valve meet the required configurations by the processing factories. Accordingly, when performing the opening action testing on the control valve, the test is applied to the actual opening and the testing opening. During testing, 4~20 mA current is transferred to the control valve and transformed via an air compressor to apply the pressure on the control valve for controlling the movement of the valve rod. The movement stroke data is displayed on the control valve, and determined manually if the control valve opening meets the requirements of the processing factory.

Manual determination has several disadvantages because the error percentage of the actual opening and the testing opening is determined by the tester. When the error percentage range is small, testers usually determine that the control valves meet the requirements. Such testing method via reading with eyes on the recorded data is incorrect and testers are prone to make errors.

SUMMARY OF THE INVENTION

Therefore, the primary objective of the present invention is to provide a method wherein the control valve testing starts with inputting related data of a tested control valve in a testing device, and then apply a specific pressure on the control valve. The sensor installed on the control valve senses the testing opening data of the control valve, and the actual opening of the tested control valve is inputted for performing an analysis in order to determine if the control valve is qualified. Then generate a calibration curve and report according to the analysis.

In order to achieve the above objective, the present invention provide a control valve testing method with steps: providing a testing device; displaying a data input interface on the testing device, and inputting data; electrically connecting the testing device to a location transmitter on a control valve, and the transmitter connected with a pointer of a valve spindle on a control valve; the testing device providing an electric current with a testing opening to an electric current air transformer, the electric current air transformer controlling an air compressor to apply a specific pressure to the control valve according to the current in order to trigger a valve spindle action of the control valve for further driving the location transmitter to obtain valve spindle action strokes, which means transferring the testing opening of the action strokes to the testing device; the testing device obtaining and comparing data of the testing opening of the control valve and data of the actual opening input, the testing device analyzing error percentage data of the actual opening and the testing opening, if the error percentage data is within the tolerance range, the analysis result being qualified, if the error percentage is not within the tolerance range, the analysis result being not qualified.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 5 is a schematic diagram of a control valve testing/calibration record table according to the present invention.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
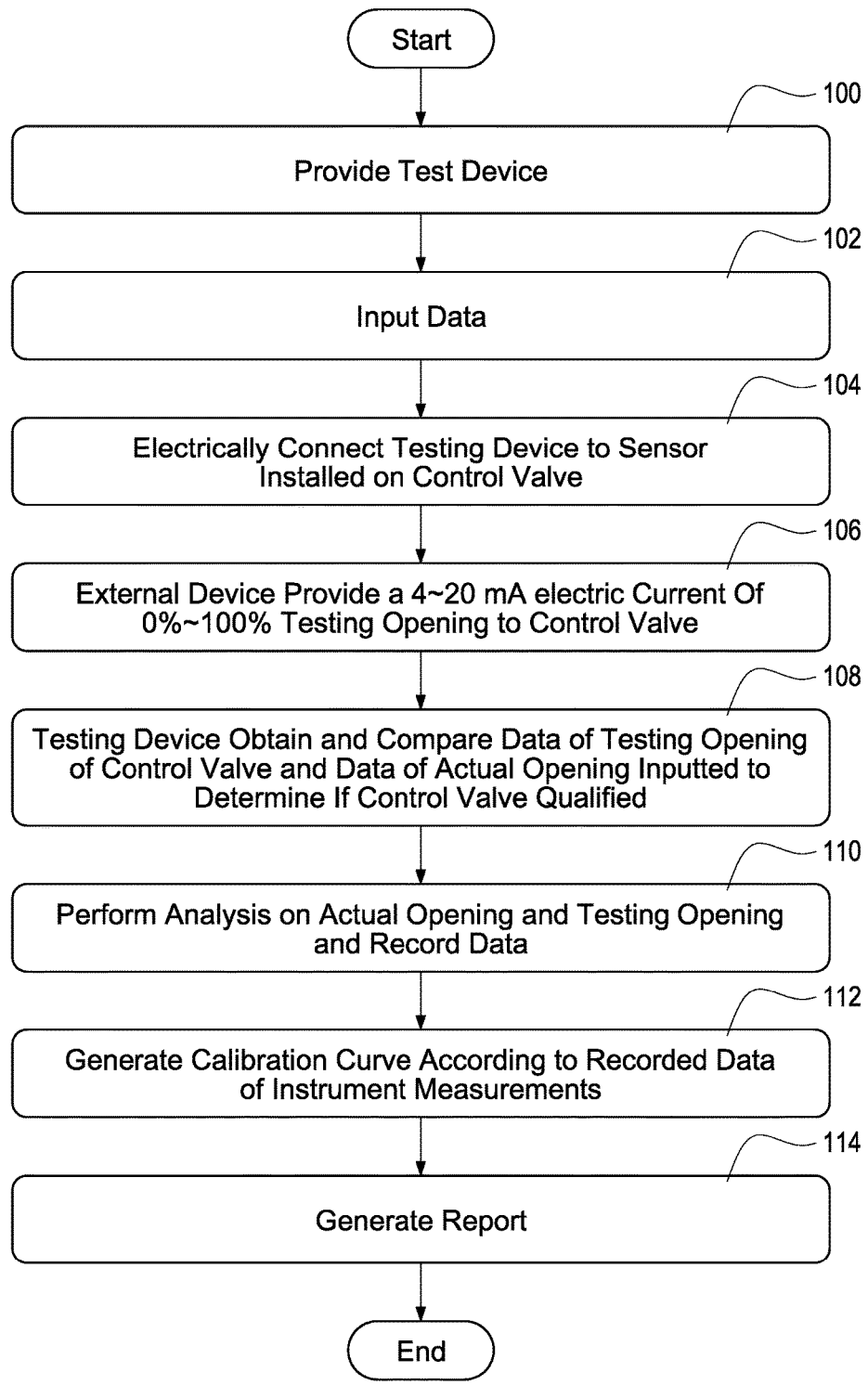
FIG. 1 is a schematic flowchart of a control valve testing method according to the present invention.

FIG. 1 is a diagram illustrating a control valve testing method according to the present invention. Firstly, in step 100: it provides a testing device. The testing device is used for performing computing on data inputted manually and analyzing the opening of valve door in the control valve measured by the testing device.

In step 102: data is input (the data is provided by the associated organization of tested device). The display of the testing device (not shown in the diagram) shows the data input interface, and fields of the data input interface at least comprise: a client name field, a project name field, a determination result field, an instrument number field, an instrument brand field, an instrument serial number field, a tolerance error percentage field, a transfer function field, an action field, an operating start point field, an operating stop point field and a total action time length. The basic data is inputted via the operation interface of the testing device. The action field further comprises failure open (FO, the valve door open via a spring mechanism upon failure), failure closed (FC, the valve door close via a spring mechanism upon failure) and lock (Lock, the valve door stays unchanged upon failure).

In step 104, after the data is inputted, electrically connect the testing device to the sensor (not shown in the diagram) installed on the control valve (not shown in the diagram) for obtaining the valve door actions of the control valve.

In step 106, during testing, an external device (not shown in the diagram) or the testing device provides a 4~20 mA electric current of 0%~100% testing opening to the control valve, the electric current with a testing opening is 4 mA at 0%, 8 mA at 25%, 12 mA at 50%, 16 mA at 75% and 20 mA at 100%. The external device transfers an electric current of 4~20 mA to the input/output (I/O) of the control valve to transfer the electric current to an air compressor. The air compressor generates a specific pressure of 3~15 PSI (Pounds per square inch) or 0.2~1.0 kg/cm² to apply on an upper nozzle and a lower nozzle. The upper nozzle or the lower nozzle applies the pressure on the inside of a chamber of the control valve in order to push the diaphragm inside the chamber to act, and drive the valve spindle to move upward and downward. A pointer on the valve spindle points in the opening meter on the valve body (not shown in the diagram), at the same time the pointer further drives a location transmitter installed on one side of the valve body. The location transmitter obtains the valve spindle action strokes of the control valve, which means that the action strokes of the valve spindle are transferred to the testing device. The total action time length records the total action time required for the valve door to open or to close.

In step 108, after the testing device obtains and compares the data of the testing opening of the control valve and data of the actual opening inputted, the testing device performs an analysis on the error percentage data of the actual opening and the testing opening. If the error percentage data is within the tolerating range, the analysis result is qualified. If the error percentage is not within the tolerating range, the analysis result is not qualified.

In step 110, after performing an analysis on the actual opening and the testing opening, record the data, and save the analysis data in the storage unit.

In step 112, generate a calibration curve measured by the instrument according to the recorded data generated in step 110, and display the calibration curve on the display.

In step 114, generate a report, and transfer the above mentioned recorded data and the calibration curve to printers to print the analysis data and the curve calibration.

Figure 2:
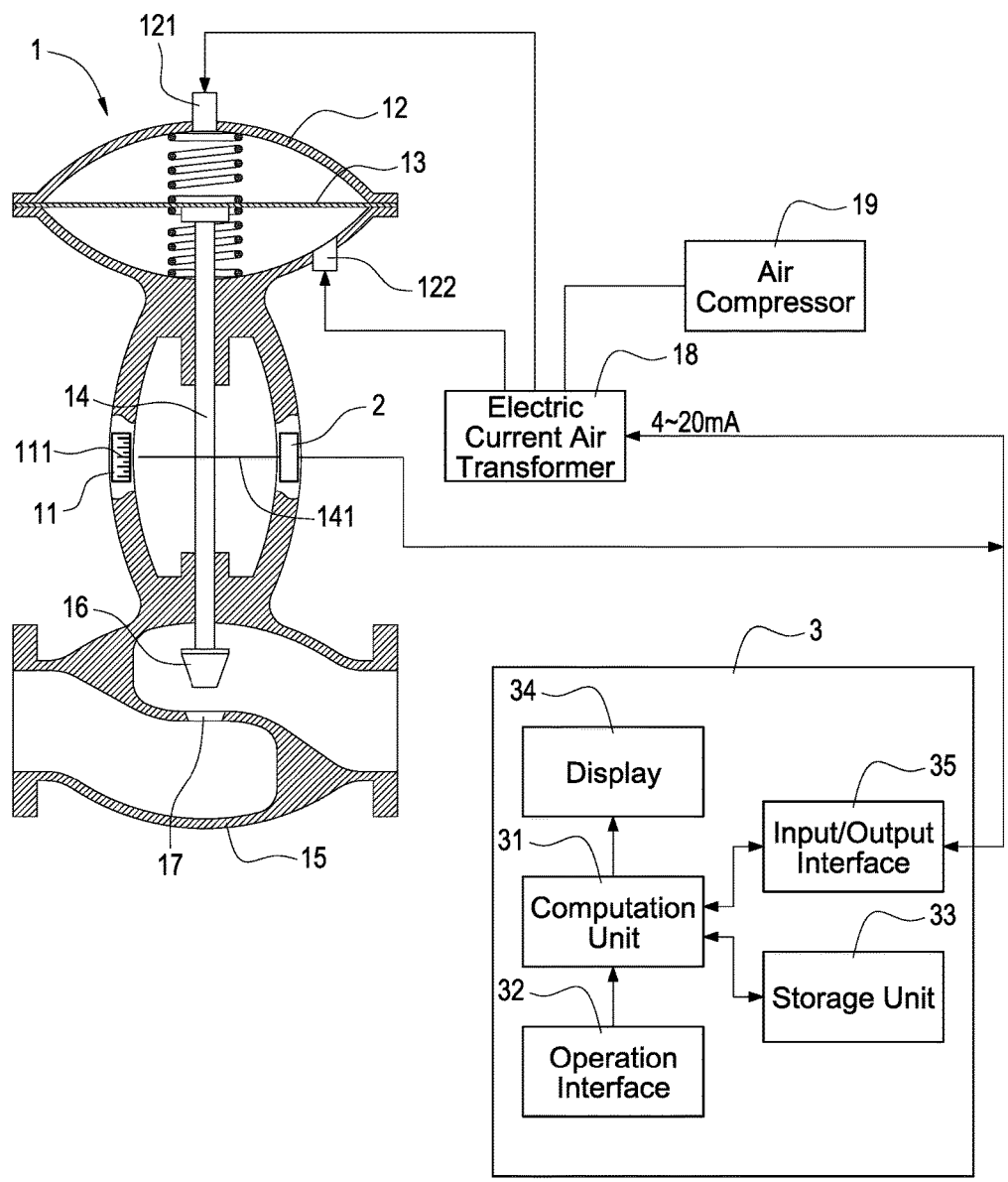
FIG. 2 is a schematic diagram of an electrical connection between the testing device and the apparatus according to the present invention.

FIG. 2 illustrates a control valve 1 according to the present invention. The control valve 1 has a valve body with a half cut-out shape 11. The top of the valve body 11 has a chamber 12. The chamber 12 has a diaphragm 13 inside. A valve spindle 14 penetrating the chamber 12 is fixed on the diaphragm 13. The valve spindle 14 has a pointer 141. The pointer 141 points at the opening meter 111 installed on one side of the valve body 11. The opening meter 111 is used for indicating data of 0%, 25%, 50%, 75%, 100% data. A location transmitter 2 is installed on a location corresponding to the valve body 11 and the opening meter 111. The location transmitter 2 connects to the pointer 141. In addition, one end of the valve spindle 14 extends to the inside of the valve base 15 on the bottom of the valve body 11 and connects to a valve door 16. The valve door 16 is located on the valve opening 17 inside the valve base 15.

An upper nozzle 121 and a lower nozzle 122 are installed on the chamber 12. An electric current air transformer (known as I/P) 18 is connected to the upper nozzle 121 and the lower nozzle 122. An air compressor 19 is connected to one end of the electric current air transformer 18. An input/output interface 35 of a testing device 3 is connected to the other end of the electric current air transformer 18. The input/output interface 35 and location transmitter 2 are electrically connected.

The testing device 3 comprises: a computation unit 31, an operation interface 32, a storage unit 33, a display 34 and an input/output interface 35.

The computation unit 31 is used for performing a comparison analysis according to input data of actual opening and data of testing opening on the control valve 1 obtained by the sensor, records analysis data and generates a calibration curve.

The operation interface 32 composed of a plurality of buttons, electrically connects to the computation unit 31, and is used for inputting the testing basic data of the control valve 1 with the plurality of buttons, and transfers the testing basic data to the computation unit 31 for performing computing.

The storage unit 33 electrically connects to the computation unit 31 and is used for saving the data generated after the computation unit 31 performs computing.

The display 34 electrically connects to the computation unit 31 and is used for displaying the basic data and the recorded data and the calibration curve generated after the analysis.

The input/output interface 35 electrically connects to the computation unit 31 and is used for providing a current of 4~20 mA current to the electric current air transformer 18 for controlling pressure applied to a chamber 12, receiving returned opening data from the location transmitter 2 at the same time, then transferring the returned opening data to the computation unit 31 for performing computing. In addition, the input/output interface 35 electrically connects to external printers (not shown in the diagram), and transfers the analysis result data of being qualified or not qualified and the calibration curve generated by the computation unit 31 to the printers to print our analysis data and the calibration curve to generate a report. The output interface is a connector (USB) or a wireless transmission module.

Figures 3, 4:
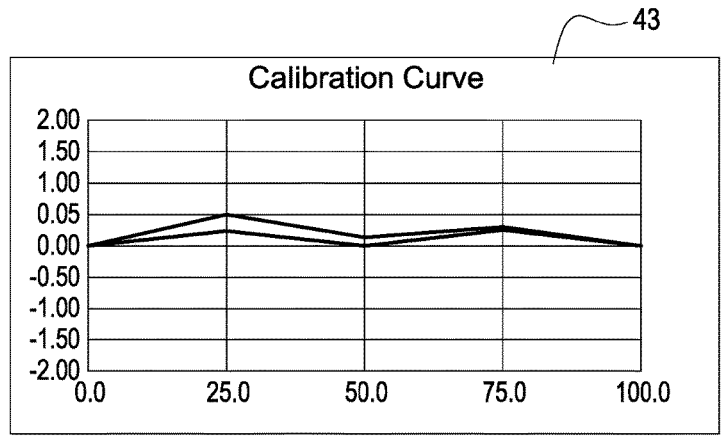
FIG. 3 is a schematic diagram of a data input interface according to the present invention.
FIG. 4 is a schematic diagram of a calibration curve according to the present invention.

Referring to FIG. 2 to FIG. 4, when the control valve is tested, display 34 of the testing device 3 shows a data input interface 36. The data input interface 36 comprises a client name field 361, a project name field 362, a determination result 363, an instrument number field 364, an instrument brand field 365, an instrument serial number field 366, a tolerance error percentage field 367, a transfer function field 368, an action field 369, an operating start point field 360, an operating stop point field 3601 and a total action time length 3602. The data of the tested device from the organization providing the tested device is inputted via the operation interface 32 of the testing device 3. For example:

Input a company name in the client name field 361;
input a testing project name in the project name field 362;
input test20140815 in the instrument number field 364;
input a brand name in the instrument brand field 365;
input 12345678-9 in the instrument serial number field 366;
input ±0.50% in the tolerance Error percentage field 367
input a function to transfer in the transfer function field 368;
input FC or FO, or LOCK in the action field 369;
input 2.00% in the operating start point field 360;
input 98% in the operating stop point field 3601;
Data Calibration Table:

| Actual opening % | Output (mA) | Testing opening % | Manual opening % | Error percentage % |
|---|---|---|---|---|
| 0 | 4.00 | 0.00 | — | 0.00 |
| 25 | 8.00 | 0.00 | — | −25.00 |
| 50 | 12.00 | 0.00 | — | −50.00 |
| 75 | 16.00 | 0.00 | — | −75.00 |
| 100 | 20.00 | 0.00 | — | −100.00 |
| 75 | 16.00 | 0.00 | — | −75.00 |
| 50 | 12.00 | 0.00 | — | −50.00 |
| 25 | 8.00 | 0.00 | — | −25.00 |
| 0 | 4.00 | 0.00 | — | 0.00 |

While the display 34 of the testing device 3 displays the content of above-mentioned data calibration table, on the same screen the data calibration table also shows. The input/output interface 35 of the testing device 3 provides 0%~100% electric current with a testing opening (4~20 mA) to the control valve 1. The electric current with a testing opening is 4 mA at 0%, 8 mA at 25%, 12 mA at 50%, 16 mA at 75% and 20 mA at 100%. The electric current of 4~20 mA is transferred to the electric current air transformer 18. The electric current air transformer 18 controls the air compressor 19 to apply 3~15 PSI or 0.2~1.0 kg/cm$^2$ to the upper nozzle 121 or the lower nozzle 122. The pressure is applied via the lower nozzle 122 into the chamber 12 to make the diaphragm 13 extrude upward. Meanwhile, the diaphragm 13 drives the valve spindle 14 moving upward. The pointer 141 of the valve spindle 14 points at the opening meter 111 and at the same time further drives the location transmitter 2. The location transmitter 2 transforms the movement strokes of the valve spindle 14 to data and transfers the data to the testing device 3 via the input/output interface 35. The testing device 3 performs a comparison between the data with the actual opening inputted by the testing device 3, and analyzes if the error percentage of the actual opening and the testing opening is within the tolerance range. If the error percentage of the 0%~100% actual opening and the 0%~100% testing opening is within the tolerance range, the analysis result is qualified, and on the other hand the analysis result is not qualified. Record the above-mentioned data and generate a calibration curve according to the analysis data (as shown FIG. 4).

At the same time, obtain data of the operating start point (the start point of opening operation in the valve), and the operating stop point (the start point of closing operation in the valve) in the control valve 1, control the 0%~100% total action time data of the valve 1 and transfer the data to the testing device 3 as the references for considering required time of the valve to complete actions in a safe manufacturing process.

Furthermore, in addition to performing an error percentage analysis between the actual opening and the testing opening, the method can be used for reading with eyes on the data of the pointer 141 on the valve spindle 14 points at in the opening meter 111, and input the data in the testing device 3 manually (for example input in the manual operating field in the data calibration table) used for performing an analysis with the actual opening inputted previously.

FIG. 5 is a schematic diagram of a control valve testing/ calibration record table according to the present invention. As shown in the diagram, after the calibration testing of the control valve 1 completes, the tester or the delegator may transfer the data to the printers to print out the control valve testing/calibration record table to generate a report. The control valve testing/calibration record table 4 at least comprises an input data field 41, a data calibration field 42, a calibration curve field 43, a tester field 44 and a verifier field 45.

What is claimed is:
1. A control valve testing method, comprising:
   a). providing a testing device;
   b). displaying a data input interface on the testing device, and inputting data;
   c). electrically connecting the testing device to a location transmitter on a control valve, and the location transmitter connected with a pointer of a valve spindle on the control valve;
   d). the testing device providing an electric current with a testing opening to an electric current air transformer, the electric current air transformer controlling an air compressor to apply a specific pressure to the control valve according to the electric current in order to trigger a valve spindle action of the control valve for further driving the location transmitter to obtain valve spindle action strokes, which means transferring the testing opening of the valve spindle action strokes to the testing device; and
   e). after the testing device obtaining and comparing a data of the testing opening of the control valve and a data of an actual opening inputted in step b, the testing device analyzing an error percentage data of the actual opening and the testing opening, if the error percentage data is within the tolerance range, the analysis result being qualified, if the error percentage is not within the tolerance range, the analysis result being not qualified.

2. The control valve testing method of claim 1, wherein step b further comprise:
   at least arranging a client name field, a project name field, a determination result, an instrument number field, an instrument brand field, an instrument serial number field, a tolerance error percentage field, a transfer function field, an action field, an operating start point field, an operating stop point field and a total action time length, on fields of the data input interface; and
   arranging a valve open, a failure closed and a lock, on the action field.

3. The control valve testing method of claim 1, further comprising:
   arranging a valve body with a half cut-out shape in the control valve;
   locating a chamber on a top of the valve body;
   locating a diaphragm inside the chamber;
   fixing the valve spindle penetrating the chamber on the diaphragm;
   pointing at an opening meter on the valve body by the pointer on the valve spindle;
   installing an upper nozzle and a lower nozzle on the chamber;
   connecting the upper nozzle and the lower nozzle to the electric current air transformer;
   connecting the electric current air transformer to the air compressor;
   controlling the electric current air transformer via the electric current with the testing opening to enable the upper nozzle or the lower nozzle to apply a pressure to an inside of the chamber in the control valve for pushing the diaphragm inside the chamber to act; and
   driving an upward movement and a downward movement of the pointer on the valve spindle for further driving the location transmitter to obtain a data of the valve spindle action strokes.

4. The control valve testing method of claim 3, wherein, when controlling valve actions, the testing device records an operating start point of the control valve, a data of an operating stop point, and a total action time data of the control valve operating from 0%~100%, as a recorded data, and the recorded data is transferred to the testing device and used for considering a required time of the control valve to complete actions in a safe manufacturing process.

5. The control valve testing method of claim 1, wherein the method further comprises a step f after step e, which comprises recording a data and saving an analysis data after analyzing the actual opening and the testing opening.

6. The control valve testing method of claim 5, wherein the method further comprises step g after step f, which comprises generating a calibration curve based on the recorded data by an instrument.

7. The control valve testing method of claim 6, wherein the method further comprises step h after step g, which comprises transferring the recorded data and the calibration curve to a printer to print out a testing/calibration record table of the control valve to generate a report.

8. The control valve testing method of claim 7, further comprising:
at least providing the testing/calibration record table of the control valve with an input data, a data calibration, a calibration curve, a tester and a verifier.

9. The control valve testing method of claim 8, further comprising:
obtaining a data of the pointer pointing at an opening meter on the valve spindle;
inputting the data of the pointer pointing at the opening meter on the valve spindle in an opening field in a data calibration table displayed on the testing device; and
generating a comparison analysis of the data of the pointer pointing at the opening meter on the valve spindle and the actual opening inputted previously.

10. The control valve testing method of claim 9, further comprising:
arranging a computation unit in the testing device;
performing, by the computation unit, the comparison analysis according to the data of the actual opening and the data of the testing opening on the control valve obtained by the location transmitter;
recording the analysis data and generating the calibration curve by the computation unit;
arranging an operation interface in the testing device;
arranging a plurality of buttons electrically connected to the computation unit on the operation interface;
inputting with the buttons, a testing basic data of the control valve;
transferring, by the operation interface, the testing basic data of the control valve to the computation unit for performing computing;
arranging a storage unit electrically connected to the computation unit in the testing device;
saving, by the storage unit, a data generated by performing a computing of the computation unit;
arranging a display electrically connected to the computation unit in the testing device;
displaying, by the display, the data input interface, the recorded data and the calibration curve generated by the computation unit;
arranging an input/output interface electrically connected to the computation unit in the testing device;
providing, through the input/output interface, a current of 4~20 mA to the electric current air transformer for controlling a pressure applied to a chamber;
receiving, by the input/output interface, a returned opening data from the location transmitter; and
transferring, by the input/output interface, the returned opening data to the computation unit for performing computing.

* * * * *